(12) United States Patent
Blersch et al.

(10) Patent No.: US 10,767,758 B2
(45) Date of Patent: Sep. 8, 2020

(54) TRANSMISSION CONTROL DEVICE

(71) Applicant: REINZ-DICHTUNGS-GMBH, Neu-Ulm (DE)

(72) Inventors: Robert Blersch, Baltringen (DE); Oliver Claus, Laichingen (DE); Georg Egloff, Weibenhorn (DE); Kurt Hoehe, Langenau (DE); Matthias Pendzialek, Ulm (DE)

(73) Assignee: Reinz-Dichtungs-GmbH, Neu-Ulm (DE)

( * ) Notice: Subject to any disclaimer, the term of this patent is extended or adjusted under 35 U.S.C. 154(b) by 327 days.

(21) Appl. No.: 15/738,788

(22) PCT Filed: Jun. 29, 2016

(86) PCT No.: PCT/EP2016/065177
§ 371 (c)(1),
(2) Date: May 14, 2018

(87) PCT Pub. No.: WO2017/001501
PCT Pub. Date: Jan. 5, 2017

(65) Prior Publication Data
US 2018/0252309 A1    Sep. 6, 2018

(30) Foreign Application Priority Data

Jun. 29, 2015 (DE) .................... 20 2015 103 421 U

(51) Int. Cl.
*F16K 15/02* (2006.01)
*F16K 15/14* (2006.01)
(Continued)

(52) U.S. Cl.
CPC ........ *F16H 61/0009* (2013.01); *F16J 15/064* (2013.01); *F16J 15/0825* (2013.01);
(Continued)

(58) Field of Classification Search
CPC . F02D 9/18; F02D 9/08; F16K 15/023; F16K 15/144; F16H 61/0009;
(Continued)

(56) References Cited

U.S. PATENT DOCUMENTS 2,643,914 A * 6/1953 Reswick ................ B65D 83/75
222/394
5,388,615 A * 2/1995 Edlund .............. B65D 51/1644
137/859
(Continued)

FOREIGN PATENT DOCUMENTS

DE    10 2004 031 458 A1    1/2006
DE    20 2007 004 323 U1    7/2008
(Continued)

OTHER PUBLICATIONS

Machine Translation of DE102009056135A1 retrieved from espacenet.com Jan. 2020. (Year: 2020).*
(Continued)

*Primary Examiner* — Jessica Cahill
(74) *Attorney, Agent, or Firm* — Marshall & Melhorn, LLC

(57) ABSTRACT

Transmission control devices may have two control boxes, and a planar transmission control plate disposed between the two control boxes. The transmission control plate seals the intermediate space between the two control boxes or the channel portions and borings thereof in the form of a flat gasket. The plate also makes available throughflow-openings between channels or borings in the control boxes for a fluid, the fluid in the channels controlling the function of a transmission. The sealing function is achieved by embossed beads and/or partial coatings.

20 Claims, 11 Drawing Sheets

(51) Int. Cl.
*F16H 61/00* (2006.01)
*F16J 15/08* (2006.01)
*F16J 15/06* (2006.01)

(52) U.S. Cl.
CPC .......... *F16K 15/023* (2013.01); *F16K 15/144* (2013.01); *F16J 2015/085* (2013.01); *F16J 2015/0868* (2013.01)

(58) Field of Classification Search
CPC ................ Y10T 137/7895; F16J 15/064; F16J 15/0825; F16J 2015/085; F16J 2015/0868
See application file for complete search history.

(56) References Cited

U.S. PATENT DOCUMENTS

| | | | | |
|---|---|---|---|---|
| 5,469,884 | A * | 11/1995 | Madrid | F16K 15/026 137/515.7 |
| 7,918,217 | B2 * | 4/2011 | Walz | F02D 9/08 123/568.17 |
| 8,714,192 | B2 * | 5/2014 | Haltmayer | A47L 15/4217 137/528 |
| 9,897,208 | B2 | 2/2018 | Hoehe et al. | |
| 2002/0079651 | A1 * | 6/2002 | Unseld | F02F 11/002 277/592 |
| 2005/0257838 | A1 * | 11/2005 | Enerson | F16K 15/023 137/528 |
| 2007/0163656 | A1 * | 7/2007 | Mijers | F16K 15/144 137/493.9 |
| 2008/0190404 | A1 * | 8/2008 | Weisz | F16K 3/0281 123/568.26 |
| 2009/0166575 | A1 * | 7/2009 | Bereznai | F16K 21/02 251/368 |
| 2014/0238497 | A1 * | 8/2014 | Jones | F16K 15/144 137/1 |
| 2015/0118076 | A1 * | 4/2015 | Grassbaugh | F16K 15/023 417/292 |

FOREIGN PATENT DOCUMENTS

| | | | | |
|---|---|---|---|---|
| DE | 202007004323 U1 * | 7/2008 | | F02M 26/70 |
| DE | 10 2008 062 829 A1 | 7/2010 | | |
| DE | 102009024091 A1 | 12/2010 | | |
| DE | 102009056135 A1 * | 6/2011 | | F16J 15/064 |
| DE | 102009056135 A1 | 6/2011 | | |
| DE | 202012009539 U1 | 1/2014 | | |
| WO | 2010/072402 A1 | 7/2010 | | |

OTHER PUBLICATIONS

Machine Translation of DE202007004323 retrieved from espacenet.com Jan. 2020. (Year: 2020).*
European Patent Office, International Search Report with Written Opinion, issued in PCT/EP2016/065177, 15 pages, dated Sep. 8, 2016, European Patent Office, Rijswijk, Netherlands.
Cover page earliest claimed German priority document DE202015103421U1 with the German Search Report citations and a detailed citation list, two pages, dated Aug. 11, 2016, German Patent Office.

* cited by examiner

TRANSMISSION CONTROL DEVICE

BACKGROUND OF THE INVENTION

The present invention relates to a transmission control device. Such transmission control devices normally have two counter-components which are disposed opposite each other, such as for example control boxes, and also a planar transmission control plate which is disposed between the two counter-components. This transmission control plate has the object, on the one hand, of sealing the intermediate space between the two counter-components or the channel portions and borings thereof in the form of a flat gasket and, on the other hand, the object of making available through-openings between channels or borings in the oppositely situated counter-components for a fluid, the fluid in the channels controlling the function of a transmission. The sealing function is thereby achieved normally by embossed beads and/or partial coatings. Transmission control plates have therefore throughflow-openings for a fluid, via which the fluid can flow through from one side of the transmission control plate to the other side of the transmission control plate. In such throughflow-openings, additional functional elements can be present, for example valve elements, which block the throughflow in one direction, or also combined valve-diaphragm elements which limit the throughflow in one or both directions.

For example, DE 20 2012 009 539 U1 shows a transmission control plate, in which, within a throughflow-opening in the transmission control plate, a moveable valve element is disposed. The mounting of such functional elements is normally effected by additional measures and is complex and cost-intensive.

SUMMARY OF THE INVENTION

Starting from this state of the art, it is therefore the object of the present invention to make available a transmission control device in the case of which valves can be produced simply, economically and reliably.

This object is achieved by the transmission control device according to claim Advantageous developments of the transmission control device according to the invention are given in the dependent claims.

The transmission control device according to the invention has two counter-components which are disposed situated opposite each other. These can be, for example, control boxes (lower box and upper box) and the like. A counter-component can thereby also be multipart. Furthermore, a planar transmission control plate is situated between the two counter-components which are disposed situated opposite each other. This transmission control plate has at least one throughflow-opening for a fluid which is in communicating connection with respectively at least one fluid channel and/or one boring in the counter-components on both sides of the transmission control plate, in particular in communicating connection with fluid channels on both sides of the transmission control plate or in particular in communicating connection with borings on both sides of the transmission control plate or in particular in communicating connection with a fluid channel and a boring respectively on one side, i.e. adjacent to different sides of the transmission control plate.

The fluid channels in the counter-components generally extend parallel to the plane of the transmission control plate. The borings extend perpendicularly to or at least essentially perpendicularly to the plane of the transmission control plate.

Like conventional transmission control plates also, the transmission control plate according to the invention has at least one planar carrier layer. The central plane of this carrier layer is intended—if nothing different is indicated in the individual case—to define the plane of the transmission control plate.

Adjacent to the first surface of the carrier layer, orientated towards a first counter-component (with one or more immediate layers situated therebetween), a first functional layer is disposed. Between the first functional layer and the carrier layer, in turn a spring layer is disposed. As described above, the at least one throughflow-opening extends through the entire transmission control plate, i.e. also the first functional layer and the spring layer have an opening which, together with the opening in the carrier layer, form the throughflow-opening through the transmission control plate. The clear widths of the openings in the individual layers can thereby be of different sizes or also be of equal sizes. The openings can also have a different design or be subdivided into partial openings. It is particularly advantageous if some or all of these openings are disposed concentrically relative to each other, however they can also have a non-concentric configuration.

The throughflow-opening extends thereby through the layers and elements of the transmission control plate between both surfaces of the transmission control plate. However it need not extend continuously perpendicularly to the transmission control plate but can also have an offset, e.g. in the carrier layer. Branches are likewise possible.

The spring layer now has at least one spring plate which is disposed, in projection of the transmission control plate perpendicularly to the planar extension thereof, within the throughflow-opening in the spring layer and is an integral component of the spring layer, i.e. is formed in one piece with the spring layer. The throughflow-opening in the first functional layer and in the spring plate are now configured for example such that the spring plate, in the unloaded state of the spring plate, is supported on the region of the first functional layer which abuts against the circumferential edge of the throughflow-opening and closes the throughflow-opening. There should be understood thereby by abutting region of the first functional layer, that region of the functional layer which abuts directly against the circumferential edge of the through-opening.

For example, the spring plate can have a larger circumference than the clear width of the throughflow-opening in the first functional layer.

The transmission control device according to the invention makes it possible that the throughflow of a fluid through the at least one throughflow-opening can be effected merely in one direction, in the present example in the one in which the spring plate is raised from its support on the first functional layer because of the fluid pressure. This is termed main flow direction in the following.

Consequently, an (annular) gap opens between the circumferential edge of the through-opening in the first functional layer and the spring plate so that the fluid can flow through this gap and further through the through-opening towards the other side of the transmission control plate. Alternatively or additionally, through-opening in the spring layer can be disposed outside the spring plate. In the counter-direction, the spring plate is pressed by the pressure of the fluid towards the first functional layer and consequently blocks the passage of the fluid through the throughflow-opening. It is also possible to pretension the spring plate and, for example, to mount it such that the openings open between the retaining arms open when the valve closes. In this case, the mentioned additional openings serve for throughflow of the fluid in the open state of the valve. If a combined valve-diaphragm element is of concern, no complete blockage occurs during closure of the spring plate but rather a limited fluid flow counter to the main flow direction is furthermore possible.

The construction of the valve or valve-diaphragm element hence makes possible a reproducible control of the fluid, even if the region of the transmission control plate which abuts against the valve or valve-diaphragm element is not situated and supported circumferentially, on least on one counter-component or, in the case of the connection between two channels, on both counter-components.

On the carrier layer, a second functional layer can be disposed furthermore adjacent to the second surface thereof. The second functional layer can be designed similarly to the previously described first functional layer according to the previous four paragraphs. In particular, the second functional layer can have, instead of the first functional layer, the valve opening, i.e. the opening which is to be closed or is closed by the spring layer. The spring plate can then be pretensioned such that it is retained in fact on the first side of the carrier layer but, in the closed state of the valve, it is supported on the second functional layer and closes the valve opening situated therein. The throughflow direction through the carrier layer is then directed from the second functional layer to the first functional layer.

The second functional layer can have flow-conducting elements which are disposed in the region of the throughflow-opening through the second functional layer or starting from the latter in the flow direction or counter-flow direction, and a throughflowing fluid is set in a rotational movement about the longitudinal axis of the flow direction.

Advantageously, the transmission control plate has at least one path-limiting element for limiting the path of the spring plate in the direction of the second side of the carrier layer. The path-limiting element can advantageously be configured in one piece with the carrier layer or with the functional layer which is situated opposite the valve opening, i.e. for example in the case where the valve opening is disposed in the first functional layer, with the second functional layer and can be disposed, further advantageously, in projection of the transmission control plate perpendicularly to the planar extension thereof, within the throughflow-opening in the carrier layer and/or in the functional layer and also at a spacing relative to the circumference of the throughflow-opening in the carrier layer and/or in the functional layer. Advantageously, the path-limiting element is disposed concentrically relative to the spring plate so that the spring plate, with maximum deflection, is supported in the centre on the path-limiting element.

The path-limiting element can be connected advantageously at at least two connection points to the circumferential edge of the throughflow-opening of the carrier layer or of the associated functional layer. Advantageously, the connection is effected via one or more pairs of adjacent connection points which can likewise be part of the carrier layer or of the functional layer. These can advantageously be disposed along the circumferential edge of the carrier layer or of the functional layer such that the centres of the connection points respectively of adjacent connection points are disposed offset relative to each other by at least 85° along the circumferential edge of the through-opening.

As connection elements, for example one or more webs can be used, which protrude, in projection of the transmission control plate perpendicularly to the planar extension thereof, into the throughflow-opening and are connected to each other possibly at the ends thereof which protrude into the throughflow-opening. They can thereby form a common web which spans across the throughflow-opening or at least one star with three or more web elements also in the region of the connection thereof. In a further embodiment of the present invention, merely one web can also be used as connection element, which protrudes freely into the throughflow-opening. It is then advantageous for this purpose if the web has a minimum width of 0.1 to 0.9 mm and/or is connected in one piece to the spring layer which surrounds the relevant throughflow-opening and from which this web is formed, along a circular portion of at least 25°, advantageously at least 30°, of the circular circumference of the circumferential edge of the through-opening. The latter is advantageous in particular for individual webs which do not cooperate with further web elements. In individual cases, the binding of the web can thereby extend over up to 180° of the circular circumference. Normally, the connection is however not wider than a circular section of 120°, preferably 90°, in particular 60°.

Advantageously, the path-limiting element can be mounted elastically and thus form a resilient limit stop for the spring plate. The spring rates for the spring layer and for this elastically mounted path-limiting element can be chosen to be different. Thus, it is possible to design the opening behaviour of the spring plate variably along the opening path. For example, the path-limiting element can have a higher spring rate than the spring layer so that the opening movement of the spring plate, after contact with the elastically mounted path-limiting element, occurs significantly more slowly or with a lesser deflection in the case of the same pressure on the spring plate.

Both the spring plate and the path-limiting element can have a deformation, for example an embossing, which protrudes out of the spring plate or the path-limiting element counter to the flow direction of the fluid (throughflow direction of the spring plate). This can be configured as a generally convex shaping or also in the form of a cup. This convex or cup-shaped embossing serves as flow-conducting element for the throughflowing fluid which is thereby directed around the spring plate or the path-limiting element. This reduces the flow resistance of these elements.

Advantageously, the first or second functional layer has, circumferentially about the through-opening or valve opening along the circumferential edge of the through-opening, a deformation, such as for example an (e.g. embossed) bead or (e.g. embossed, e.g. undulating) profiling, a metal ring, a border, or a rubber element which is for example injection-moulded, which protrude in the direction of the spring plate. These form, for the spring plate, a support, subsequently also termed support element or sealing element, which improves both the seal between the functional layer, which has the valve opening, and the spring plate and, on the other hand, prestresses the spring plate in the throughflow direction. The opening behaviour of the spring plate can be determined via the design of this embossing, of this metal ring or of the rubber element and also via the pretension of the spring plate by means of its retaining elements, Such a deformation can however also be configured, as a replacement or supplement on the spring plate, along the outer edge thereof so that it protrudes out of the spring plate in the direction towards the functional layer which has the valve opening, it forms here the sealing- and pretensioning element, and the functional layer forms the support. If such a deformation is configured both on the spring plate and on the functional layer, these deformations can be disposed such that they come to be situated one on the other upon contact between the spring plate and the functional layer.

Also the path-limiting element can have a corresponding deformation, for example an embossing (e.g. a bead or an undulating profiling), a metal ring, a border, or a rubber element, which serve as support for the spring plate for limiting the opening path thereof.

Profilings or beads disposed in the path-limiting element, in the first or second functional layer and/or in the spring plate, have advantageously a thickness, determined perpendicular to the neutral axis of the respective layer, which is reduced in the sides of the profiling or of the bead(s), preferably is reduced by ≥15%, preferably is reduced by ≥22%, compared with the regions which are adjacent in the layer plane. If, as described above, a bordered region is provided, then the thickness thereof can be reduced relative to the thickness of the adjacent region, preferably reduced by ≥8%. That layer portion which is bordered and which has the free end of this layer is therefore reduced in its thickness relative to the non-bordered portion of this layer. As a result of the border, a thickness is however produced in the sum of both layer portions.

The mounting of the spring plate in the spring layer is effected via one or more retaining arms. These retaining arms can be connected in one piece to the spring plate as part of the spring layer so that the region surrounding the through-opening of the spring layer, the retaining arms and the spring plate together form the spring layer. Individual retaining arms can thereby be branched further also, which endows them with improved service life.

A helical configuration and arrangement of the retaining arms between the circumferential edge of the spring plate and the circumferential edge of the throughflow-opening is particularly advantageous. Advantageously, a predetermined spring characteristic of the retaining arms perpendicularly to the layer plane is consequently achieved, for example a linear or non-linear spring characteristic line. As a result, raising of the spring plate from its support can be controlled. A helical configuration of the retaining arms between the spring plate and the outer circumferential edge of the throughflow-opening in the spring layer makes it possible that, with increasing deflection of the spring plate between the retaining arms, increasingly larger throughflow regions are opened, via which the fluid can flow between the outer circumferential edge of the throughflow-opening and the outer circumferential edge of the spring plate.

According to the invention, it is possible furthermore to dispose a further functional layer on the second side of the carrier layer or also on the first side of the carrier layer. This can have a rigid configuration and have a further path-limiting element, relative to the above-described first path-limiting element, in the region of the throughflow-opening. In particular if the above-described first path-limiting element is mounted elastically in the first functional layer or in the second functional layer and consequently is deflected itself as a function of the pressure ratios, such a further, relatively rigid path-limiting element can be used in order to limit the deflection of the first path-limiting element for its part.

Furthermore, it is possible to dispose at least two throughflow-openings in the transmission control plate, which openings make possible a throughflow of the fluid in mutually opposite directions. For this purpose, a second spring layer is disposed for example between the carrier layer and the second functional layer. The first throughflow-opening is then formed point-symmetrically relative to the second throughflow-opening, a spring layer having respectively a spring plate only for one throughflow-opening.

Furthermore, arrangements are also possible which allow the switching processes between a through-conduit through the transmission control plate and a conduit between two channels and/or borings on the same surface of the transmission control plate, so-called "OR circuits". In intermediate states, the fluid can follow both flowpaths at the same time.

In the following, a few examples of transmission control devices according to the invention are given. A large number of advantageous features of a transmission control device according to the invention is thereby represented respectively in connection with each other. These individual optional features can however develop the present invention, not only together but also individually or in combination with other optional features from other examples.

In the region about their through-openings and/or about channels, in particular in the counter-components, but for example also on the outermost layers, transmission control devices can comprise sealing elements, e.g. in the form of coatings and/or beads. However an illustration of such sealing elements has been dispensed with here.

For the same or similar elements, subsequently the same or similar reference numbers are used so that description thereof is in part not repeated.

BRIEF DESCRIPTION OF THE DRAWINGS

There are shown

DETAILED DESCRIPTION OF THE INVENTION

Figure 1A:
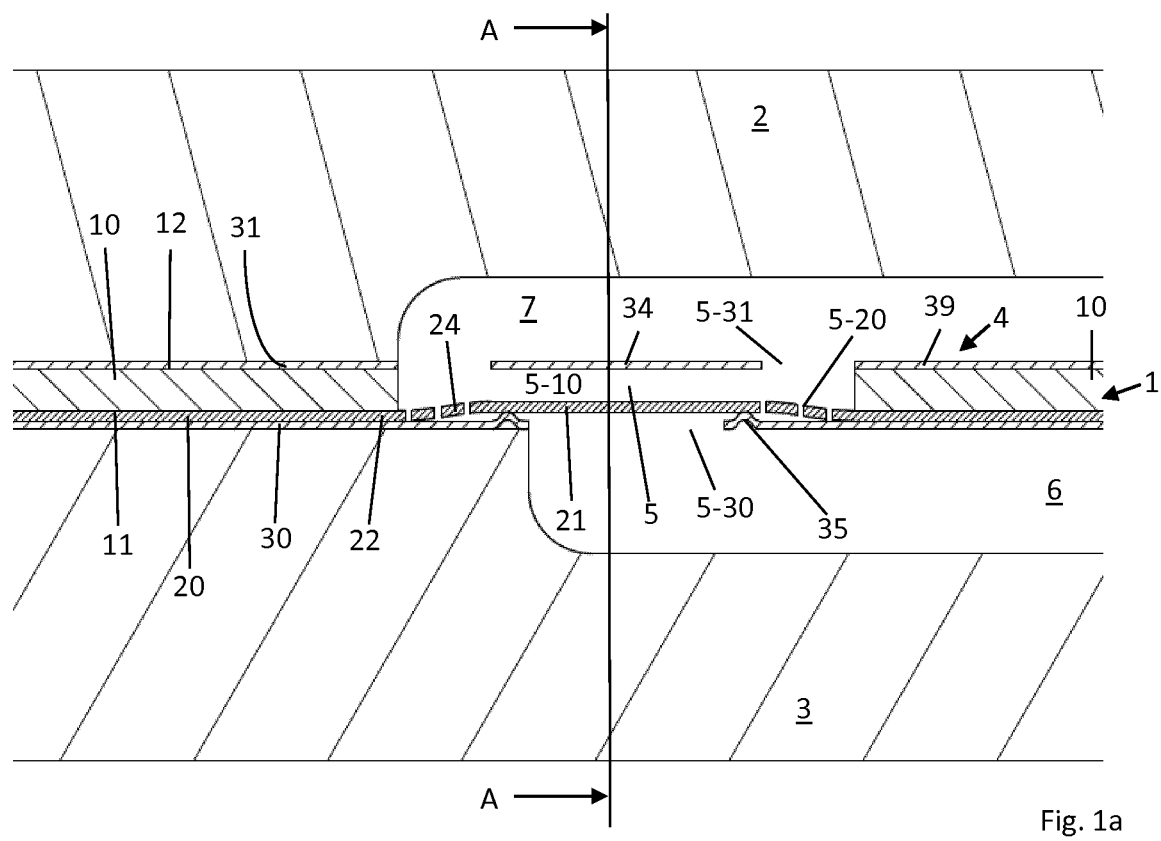
FIGS. 1 to 3 various embodiments of transmission control devices according to the invention.

FIG. 1 shows a transmission control device 1. This transmission control device 1 has an upper box 2 and a lower box 3, between which a transmission control plate 4 is disposed. There are provided, in the upper box 2, a fluid channel 7 and, in the lower box 3, a fluid channel 6, which are connected together via a throughflow-opening 5 in the transmission control plate 4. Both channels 6 and 7 extend parallel to the plane of the transmission control device 1 or of the transmission control plate 4.

The individual portions of the throughflow-opening 5 in the various layers of the transmission control plate 4 are characterised respectively in addition with the reference number of the respective layer. The transmission control plate 4 in FIG. 1a has a carrier layer 10, a spring layer 20, a first functional layer 30 and a second functional layer 31. The individual portions of the throughflow-opening 5 which extend concentrically through all the layers of the transmission control plate 4 are consequently denoted with the reference numbers 5-10, 5-20, 5-30 and 5-31.

The carrier layer 10 of the transmission control plate 4 has a first side 11 and a second side 12. The spring layer 20 and adjacently the first functional layer 30 is disposed adjacent to the first side 11. Adjacent to the second side 12 of the carrier layer 10, the second functional layer 31 is disposed.

The spring layer 20 has an outer retaining region 22 which is disposed between the carrier layer 10 and the first functional layer 30. Starting from this retaining region 22, retaining arms 24 extend in one piece up to a spring plate 21 which is disposed here concentrically in the centre of the throughflow-opening 5-20.

The first functional layer has a throughflow-opening 5-30, the clear width of which is less than the outer diameter of the spring plate 21. On the basis of the concentric arrangement of the throughflow-opening in the spring layer 20 and in the first functional layer 30, the spring plate is therefore supported on the first functional layer 30 on a region surrounding the circumferential edge of the throughflow-opening 5-30 in the first functional layer 30, provided that no fluid pressure is exerted by the fluid in the channel 6 on the spring plate 21. The support region in the present example is provided in the first functional layer 30 with a bead/embossing 35 which protrudes in the direction of the spring plate 21. This bead 35 surrounds the circumferential edge of the throughflow-opening 5-30 completely and improves the seal between the spring plate 21 and the first functional layer 30 when the spring plate 21 is supported thereon. Furthermore, this bead 35 pretensions the spring plate 21 so that a defined pressure difference between the fluid channel 6 and the fluid channel 7 is required in order to raise the spring plate 21 from the bead 35 and thus to enable throughflow of the fluid from the channel 6 into the channel 7. A flow from the channel 7 into the channel 6 is not possible since, in this case, the spring plate 21 is pressed onto the bead 35.

The second functional layer 31 likewise has a throughopening 5-31. In this, a path-limiting element 34 in the form of a disc is disposed centrally and concentrically relative to the through-opening 5-31. In FIG. 1a, it cannot be seen how this path-limiting element 34 is connected to the retaining region 39 in the layer 31. This is represented by way of example in FIG. 12, in particular in FIG. 12b, and described there.

Figure 1B:
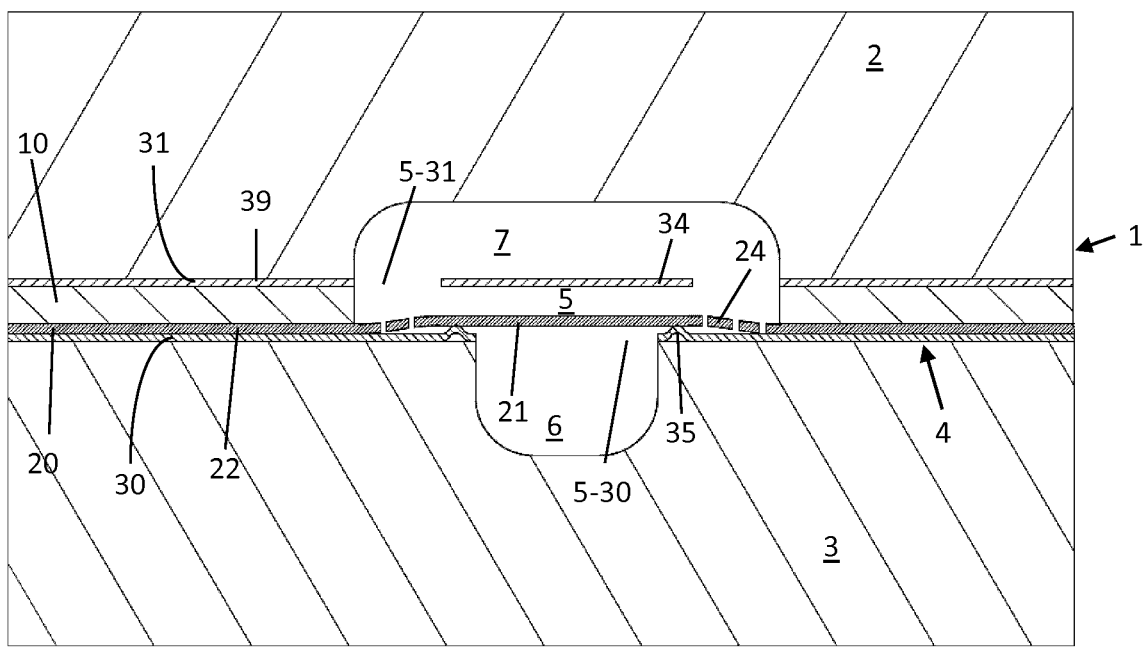

FIG. 1b shows a section through the transmission control device of FIG. 1a along the line A-A in FIG. 1a.

In this section, it can be seen that the flow cross-section of the channel 6 is smaller than the flow cross-section of the channel 7. This makes it possible to mount the first functional layer 30 up to the throughflow edge surrounding the through-opening 5-30, at least in portions on the lower box 3.

The overall view of FIGS. 1a and 1b makes it clear that both the first functional layer 30 and the second functional layer 31 are not supported in portions, namely in the region which is illustrated on the right in FIG. 1a, and serve for continuation of the two channels 6 and 7, on the control boxes 2 or 3. This means that the valve construction according to the invention has per se so much intrinsic rigidity that both opening of the valve, i.e. raising of the spring plate 21 and closing and sealing of the valve, are ensured durably and reproducibly.

Figure 2:
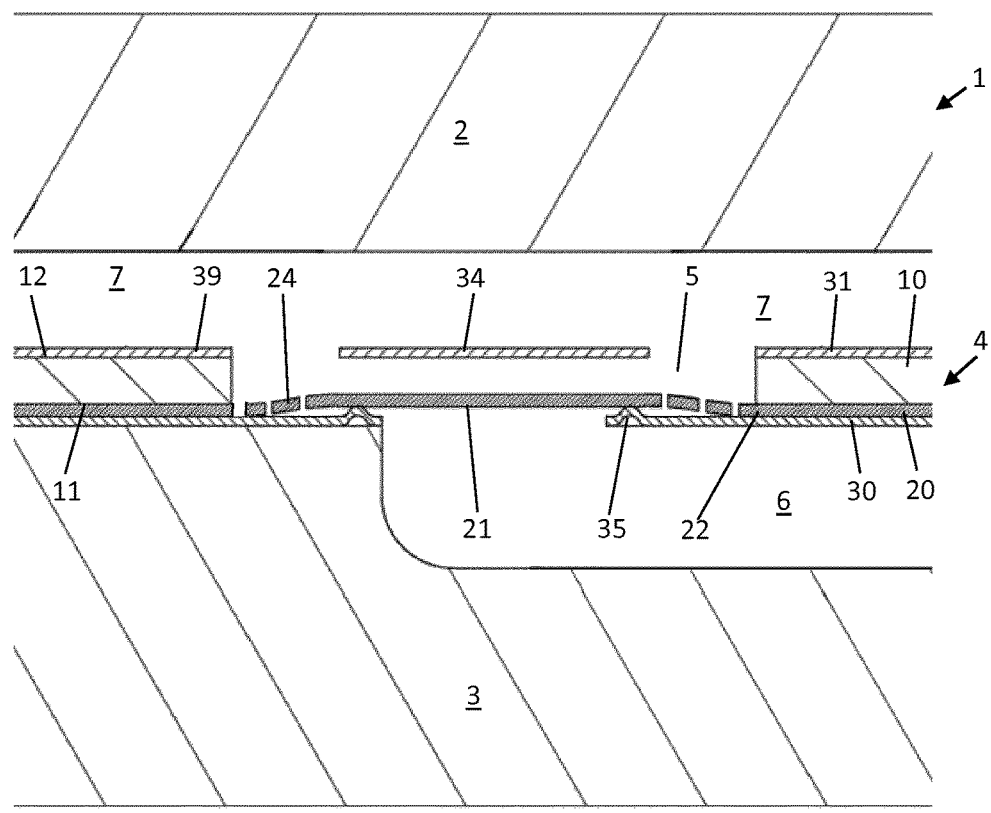

FIG. 2 shows a further transmission control device according to the invention.

Whilst, in the transmission control device according to FIG. 1, the fluid channels 6 and 7 extend, starting from the throughflow-opening 5, in one direction and in the plane of the planar extension of the transmission control device 1 or of the transmission control plate 4, now the fluid channel 7 extends in two directions, starting from the through-opening 5. The transmission control plate 4 is configured just as that in FIG. 1.

Figure 3:
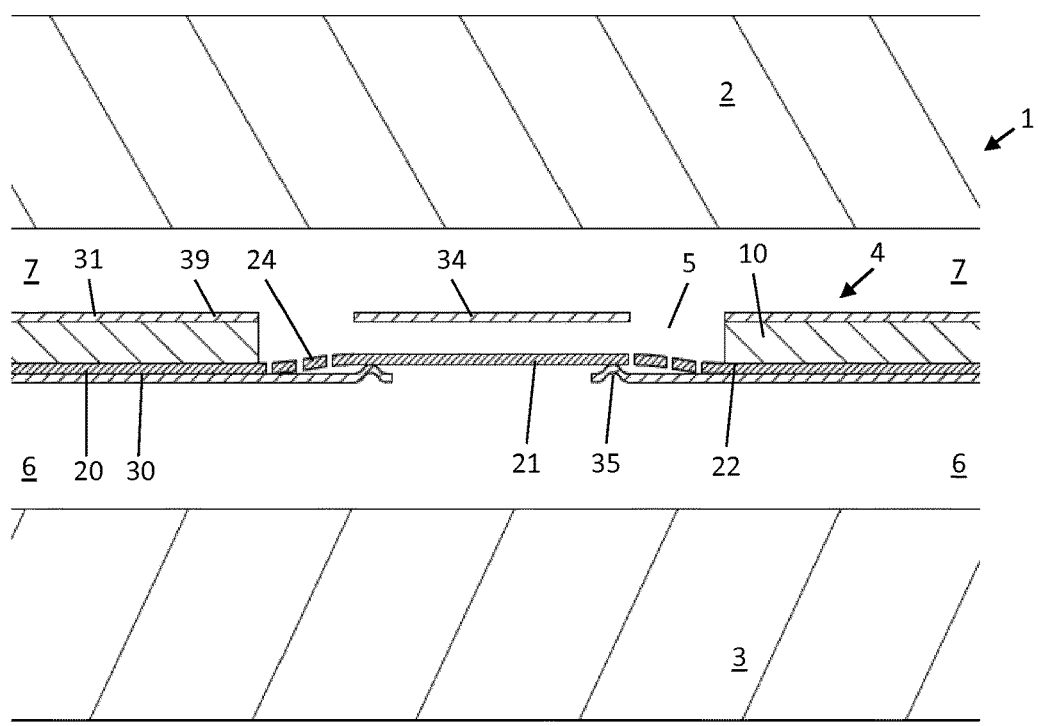

In FIG. 3, a further transmission control device 1 is illustrated, in which now both channels 6 and 7 extend respectively in two different directions. Here also, the transmission control plate 4 is configured just as that in FIG. 1.

Figure 4:
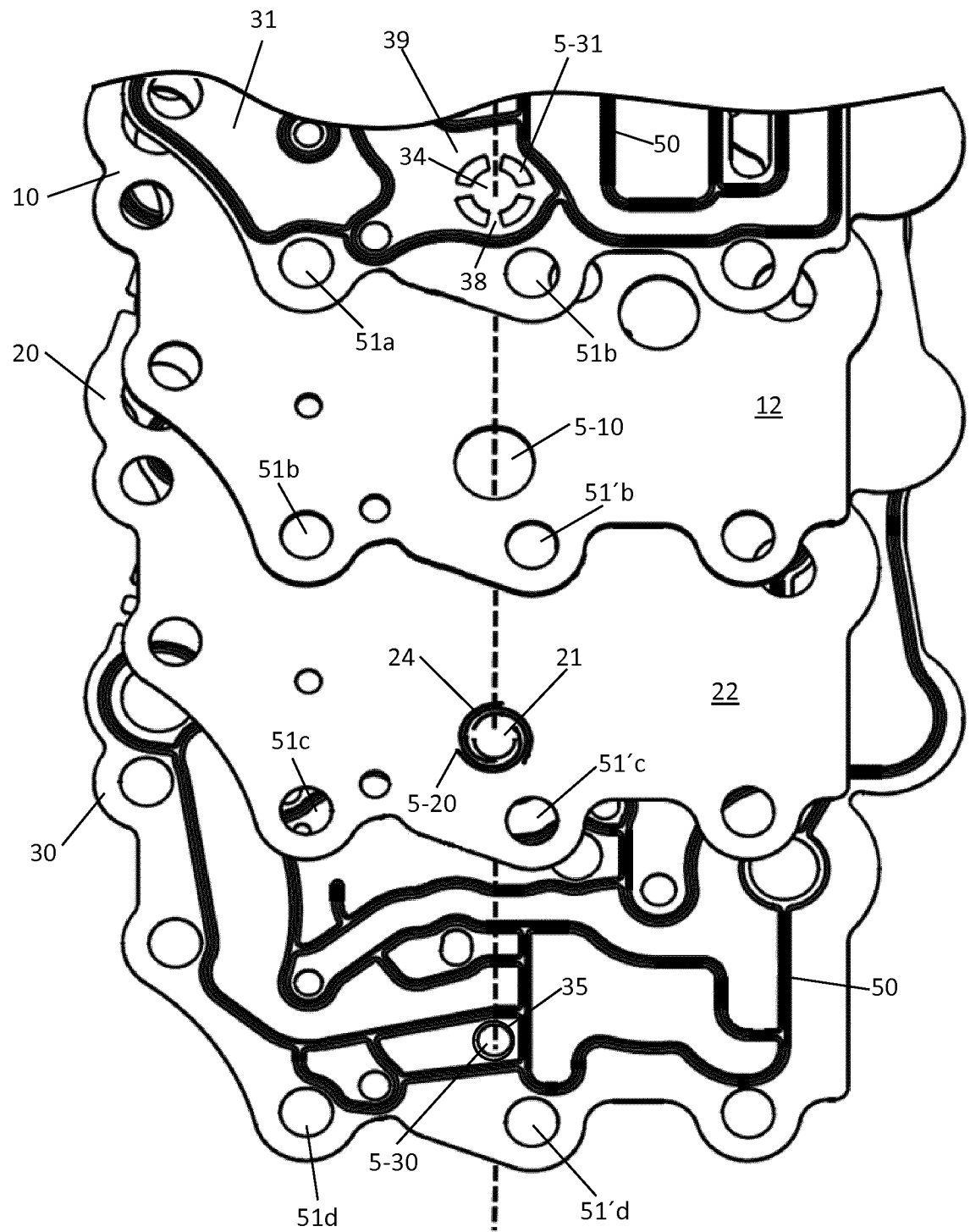
FIG. 4 a transmission control plate according to the invention in exploded illustration.

FIG. 4 shows a transmission control plate 4 according to the invention in exploded illustration, with carrier layer 10, spring layer 20, first functional layer 30 and second functional layer 31. All the layers have screw holes 51a to 51d, with which the transmission control plate 4 can be mounted between the counter-components. Furthermore, the layers have a large number of fluid through-openings, not characterised in more detail, which open on the underside of the first functional layer 30 and on the upper side of the second functional layer 31 in regions which are situated opposite channels or borings in the control boxes. These regions are delimited by beads 50. In addition, the carrier layer 10 has a through-opening 5-10. The further layers have corresponding through-openings 5-31, 5-20 and 5-30 which are disposed concentrically relative to each other. In the spring layer 20, a spring plate 21 is disposed in the throughflow-opening 5-20 via helical retaining arms 24. In the second functional layer a path-limiting element 34 is disposed in the through-opening 5-31 via retaining arms 38 on a retaining region 39. The through-opening 5-31 is therefore covered again partially by the path-limiting element 34 so that four individual throughflow portions of the through-opening 5-31 remain merely between the retaining arms 38 and the path-limiting element 34 and the outer retaining region 39. The retaining arms 38 are disposed offset relative to each other respectively by 90°. In the first functional layer 30, in addition a bead 35 is provided which surrounds the throughopening 5-30 concentrically and hence forms a support for the spring plate 21.

The through-opening 5-30 in the first functional layer 30 has a smaller clear width than the outer diameter of the spring plate 21. As a result, the spring plate 21 is supported on the circumferential edge about the throughflow-opening 5-30 in the first functional layer 30, provided no fluid pressure is applied from the channel 6.

Figure 5:
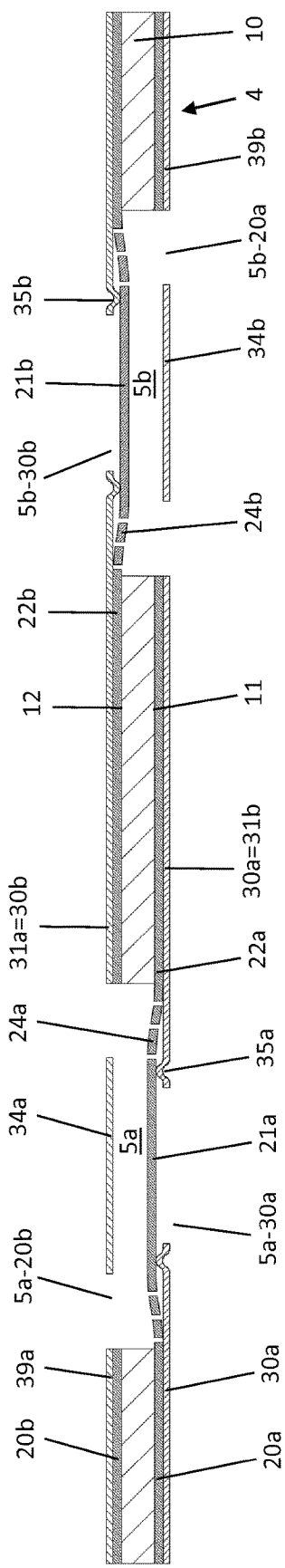
FIGS. 5 to 9 further embodiments of transmission control plates according to the invention.

FIG. 5 shows a further transmission control plate 4 according to the invention for use in a transmission control device 1 according to the invention. The transmission control plate 4 has a construction which corresponds extensively to that in FIG. 1. Now however in the transmission control plate 4, two throughflow-openings 5a and 5b are disposed, which openings enable a throughflow of the fluid which is directed in opposite directions to each other. The throughflow-opening 5a corresponds in its configuration and also in the configuration of the carrier layer 10, the spring layer 20a, the first functional layer 30a and the second functional layer 31 entirely to that of FIG. 1.

A further spring layer 20b is disposed merely between the carrier layer 10 and the second functional layer 31. Said further spring layer has a corresponding throughflow-opening, however it is not of any substantial functional significance for the throughflow-opening 5a. If however the throughflow-opening 5b is considered, then it is shown that this is configured precisely point-symmetrically to the throughflow-opening 5a so that now the second functional layer 31 fulfils the function of a first functional layer 30b, the spring layer 20b the function of the spring layer 20a and the first functional layer 30a the function of a second functional layer with path-limiting element 34. FIG. 5 shows consequently an example as to how a large number of correspondingly configured through-openings 5a, 5b with a fluid passage configured essentially in a point-symmetrical manner can be provided in a transmission control plate 4 according to the invention. The symmetry thereby relates in particular to the layer construction, the design of the individual valve can be different. Also the layer thicknesses can be different.

Figure 6:
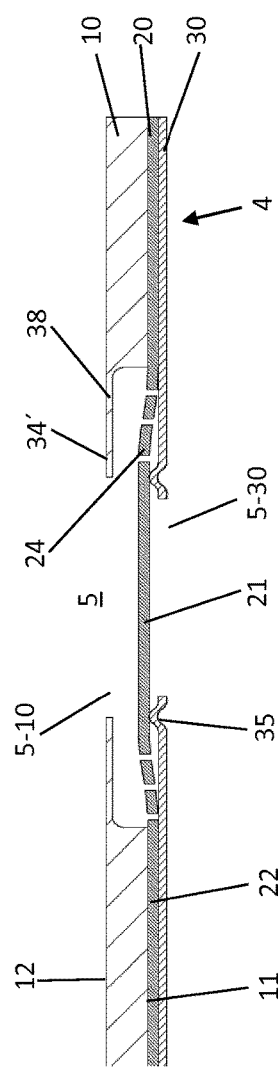

FIG. 6 shows a further transmission control plate 4 in section for use in a transmission control device according to the invention. In this case, the second functional layer is replaced by a projection 34' of the carrier layer 10, the clear width of the throughflow-opening 5-10 being smaller at least in the region of the projection 34' than the outer diameter of the spring plate 21. Consequently, with the element 34', the carrier layer also has a path-limiting element for the spring plate 21 at the same time. It is thereby essential that the thickness of the path-limiting element 34' is significantly less than the thickness of the carrier layer 10 radially outside the path-limiting element and, in this way, a path is made available for the spring plate 21 between the support 35 and the path-limiting element 34'. The retaining arms 38 of the path-limiting element 34' are furthermore not disposed completely circumferentially about the through-opening 5-10, but rather represent individual webs which protrude into the throughflow-opening 5-10. Between the individual webs, a free space remains as throughflow-opening, through which the fluid can flow towards the second side 12 of the carrier layer 10. Alternatively, the projection 34' can also extend such that, in the centre thereof, the throughflow-opening extends concentrically to the remaining throughflow-opening 4-10, the projection 34' then however has through-holes in portions, as shown e.g. in FIG. 12c. Through-holes are basically possible even with a course, in portions, of the projection 34'.

Figure 7:
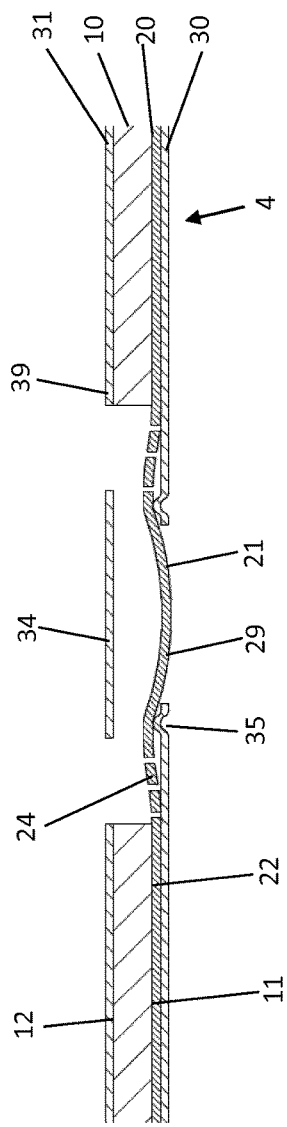

FIG. 7 shows a further example of a transmission control plate 4 according to the invention in section for use in a transmission control device according to the invention. This example corresponds completely to that in FIG. 1 with the only change that the spring plate 21 now has a concave-convex embossing 29 so that it is arched in the direction of the first functional layer 30 and counter to the throughflow direction. This arch 29 has a conducting function for the fluid which is guided, after raising the spring plate 21 from its seat 35, about the spring plate 21 and about the path-limiting element 34 so that the flow resistance is reduced.

Figure 8:
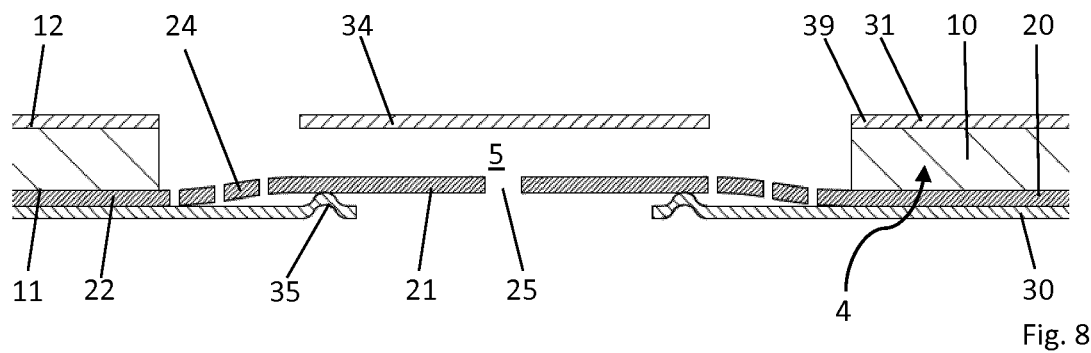

FIG. 8 shows a further embodiment of a transmission control plate 4 according to the invention for use in a transmission control device 1 according to the invention. This example likewise corresponds completely to that in FIG. 1 with the only difference that now the spring plate 21 has a central throughflow-opening 25. By means of this throughflow-opening 25, a diaphragm effect is achieved, in the closed state of the valve, so that a limited flow of fluid is ensured from the upper side of the transmission control plate 4 to the lower side, i.e. counter to the normal flow direction.

Figure 9:
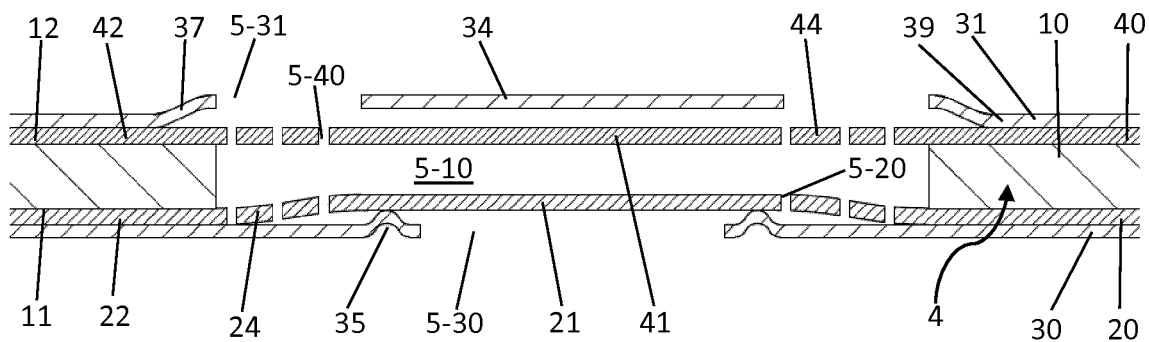

FIG. 9 shows a further example of a transmission control plate 4 according to the invention in section for use in a transmission control device according to the invention. This example likewise corresponds completely to that in FIG. 1, however, in addition on the second side 12 of the carrier layer 10, a second spring layer 40 is disposed between the carrier layer 10 and the second functional layer 31. This is configured like the first spring layer 20, however the spring rate of the spring layer 40 being different here from that of the spring layer 20. If now pressure is applied to the spring plate 21 in the throughflow-opening, the spring plate 21 is deflected until it abuts against the spring plate 41. The spring plate 41 which is mounted via retaining arms 44 on an external retaining region 42 is then likewise pressed by the fluid pressure in the direction of the path-limiting element 34. The opening of the valve in this embodiment is consequently effected in two stages with the spring rates of the spring layer 20 and the combined spring rate of the spring layer 20 and of the spring layer 40. In order to give clearance to the spring plate 41 for movement in the fluid direction, the second functional layer, between the retaining region 39 and the not-illustrated retaining arms for the path-limiting element 34, has a bend 37 which leads away from the second spring layer 40. This bend 37 is disposed circumferentially about the throughflow-opening so that the path-limiting element 34 is at a spacing relative to the spring plate 41, in the non-operative state.

Figure 10:
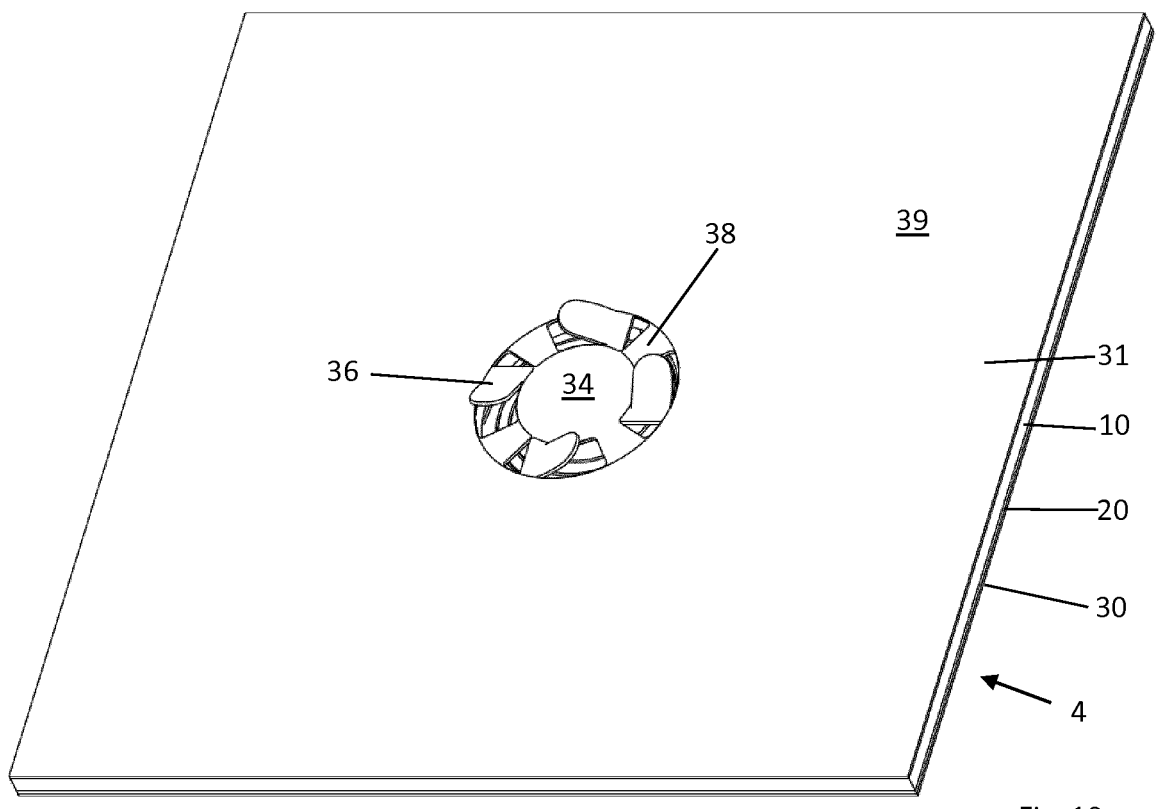
FIG. 10 a plan view in section on a transmission control plate according to the invention.

FIG. 10 shows a plan view on a transmission control plate 4 according to the invention in section for use in a transmission control device 1. In plan view on the second functional layer 31, the latter has path-limiting elements 34 which, via retaining arms 38, merge into the surrounding region 39 of the second functional layer 31. Furthermore, the functional layer 31 shows, in the throughflow spaces which remain open between the retaining arms 38, flow-conducting elements 36 which set a throughflowing fluid in rotation in an anticlockwise direction.

Figure 11A:
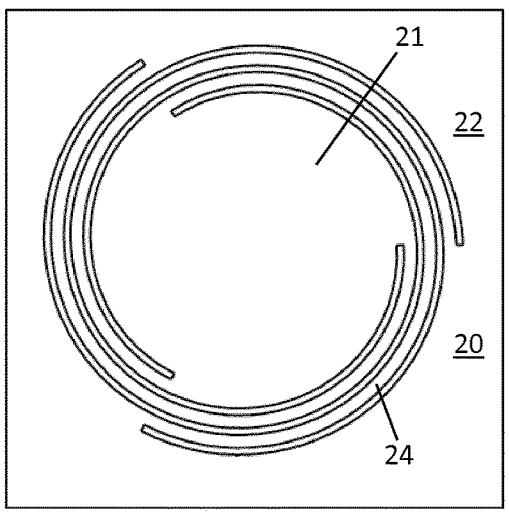
FIG. 11 various embodiments of spring layers in transmission control devices according to the invention.
Figure 11D:
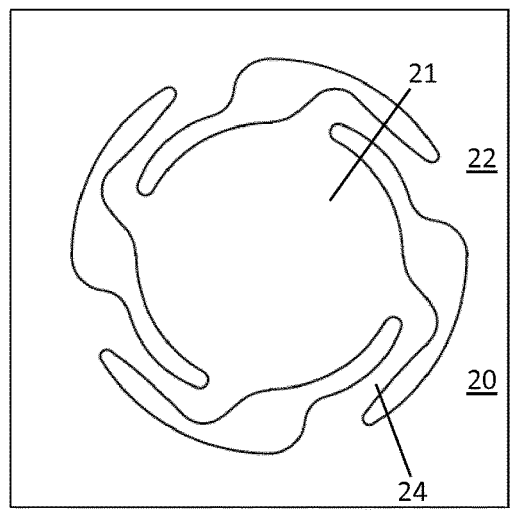
Figure 11B:
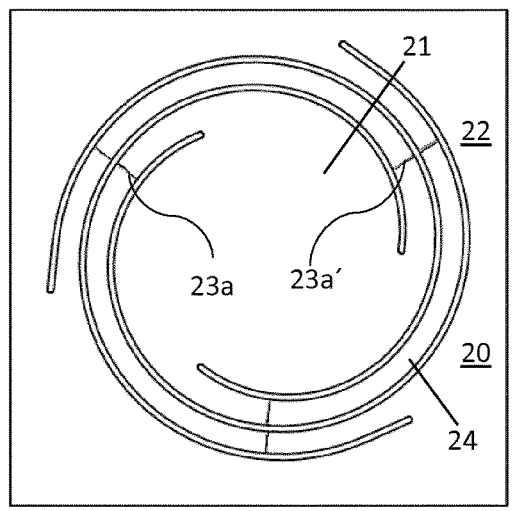
Figure 11E:
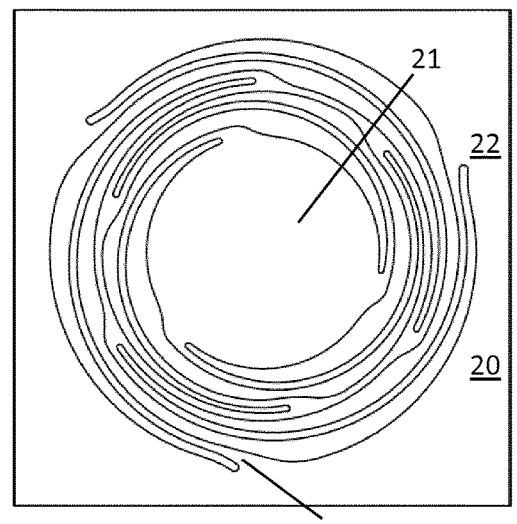
Figure 11C:
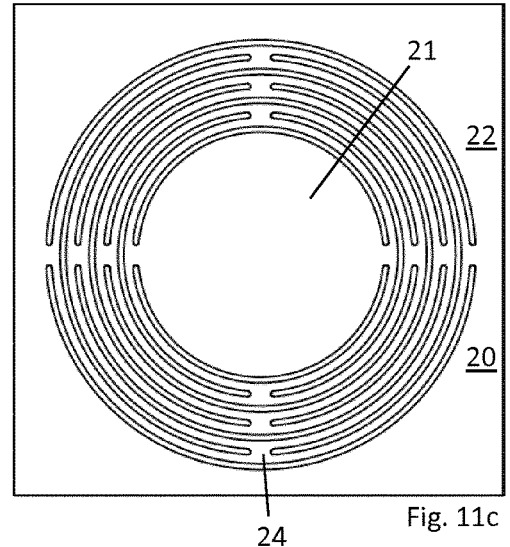
Figure 11F:
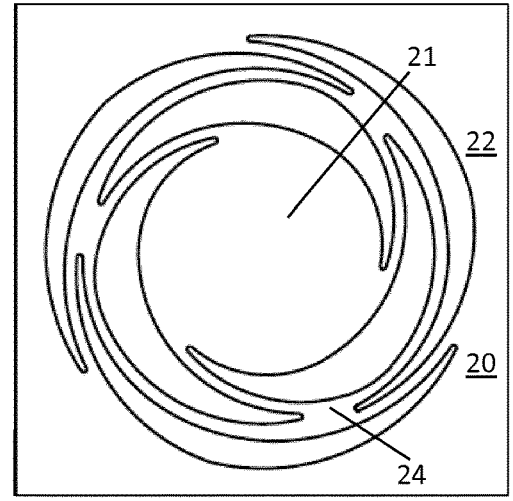

FIGS. 11a to 11f show various embodiments of the first spring layer 20, they can be used analogously for the possibly present second spring layer. The individual embodiments in the FIGS. 11a to 11f differ essentially by the configuration of the retaining arms 24. These are disposed concentrically helically in FIG. 11a. In FIG. 11b, the retaining arms 24 are likewise disposed concentrically helically, however they are wider than the retaining arms 24 in FIG. 11a and have in addition also bends or other prior deformations 23a, 23a' which influence the spring- and hence opening behaviour. In FIG. 11c, concentric retaining arms are illustrated, respectively successive retaining arms 24 being connected together at two opposite points. The connection points are offset relative to each other respectively by 90° for successive connection points in the radial direction.

In FIG. 11d, likewise concentrically circumferential retaining arms 24 are illustrated, which have a particular shape so that the throughflow surface for the fluid, which remains between the retaining arms 24, is sufficiently large.

In FIG. 11e, similar retaining arms 24 to those in FIG. 11d are illustrated, however the number thereof is greater, in addition the retaining arms are branched.

Also in FIG. 11 f, concentric, branched retaining arms 24 are illustrated, which, respectively together, leave free sickle-shaped throughflow regions for the fluid.

In FIG. 12, various embodiments of the second functional layer 31 with path-limiting element 34 are illustrated.

Figure 12A:
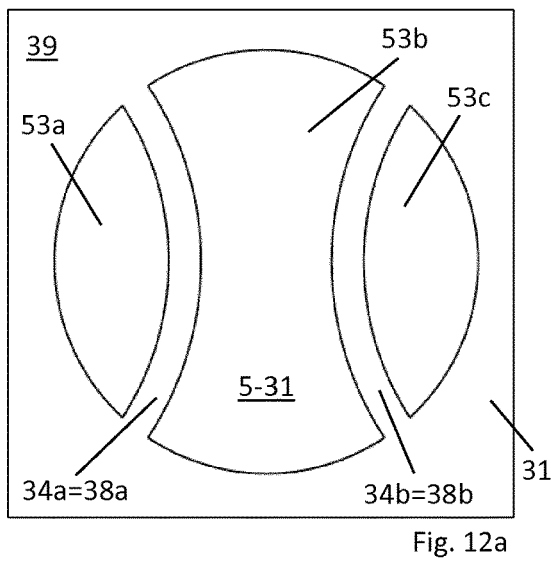
FIG. 12 various embodiments of functional layers according to the invention for use in transmission control devices according to the invention.

In FIG. 12a, the path-limiting element is produced by two bent path-limiting elements 34a and 34b in the form of webs which span across the throughflow-opening 5-31. The centres of both connection points respectively of one web are offset relative to each other respectively by approx. 120°.

Figure 12D:
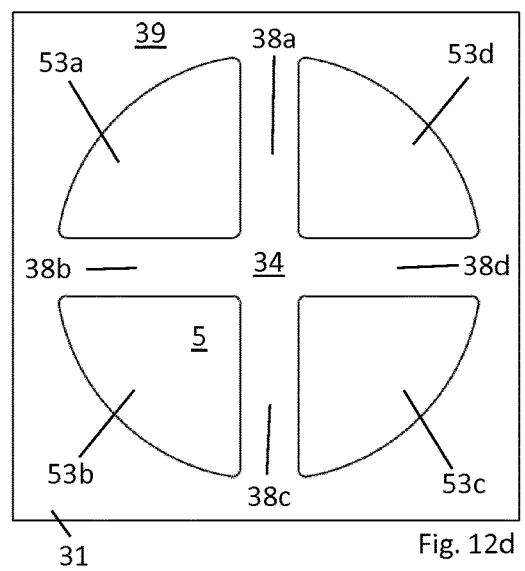
Figure 12B:
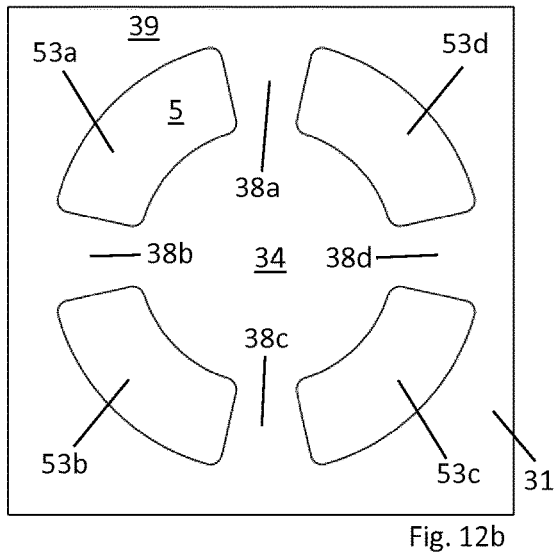

In FIG. 12b, a path-limiting element 34 is connected in one piece via retaining arms 38a to 38d to the retaining region 39 of the second functional layer 31. The retaining arms are disposed offset relative to each other respectively by 90°. They leave free between them in total four throughflow regions 53a to 53d.

Figure 12E:
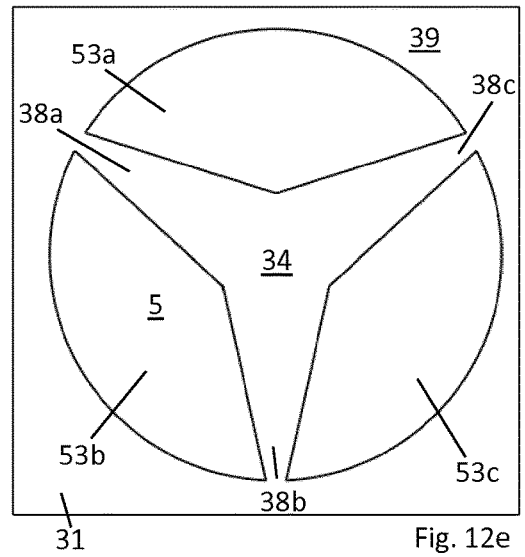
Figure 12C:
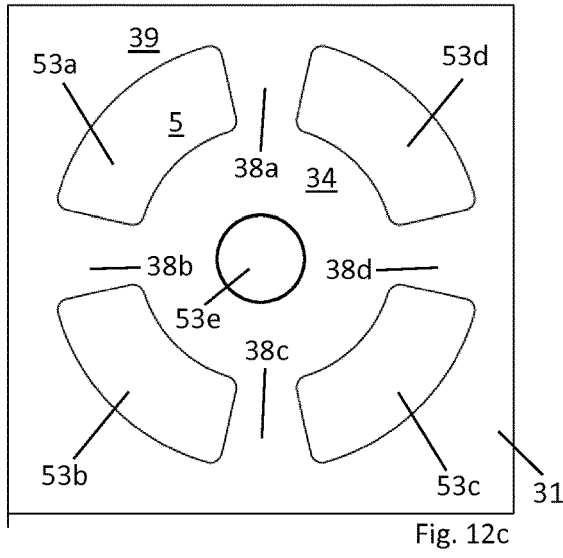

In FIG. 12c, a modification of the arrangement of FIG. 12b is illustrated. The path-limiting element 34 has, in the centre, an additional throughflow-opening 53e which can be closed by an abutting spring plate.

FIG. 12d shows a further path-limiting element which has two intersecting webs made of partial arms 38b and 38d or 38a and 38c. In the centre, these webs meet and form the path-limiting element 34.

In FIG. 12e, a modification of the embodiment of FIG. 12d is illustrated. Now it is not four arms which together form two webs spanning across the throughflow-opening which are used but merely three arms 38a to 38c which meet centrally in the throughflow-opening and thus form a star-shaped path-limiting element 34.

Figure 12F:
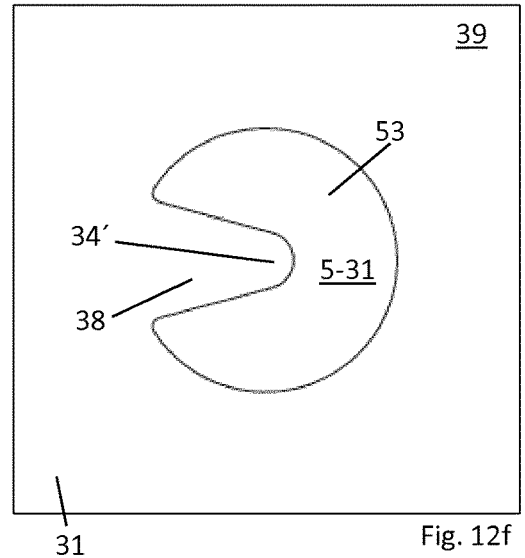

FIG. 12f shows a further embodiment of a second functional layer 31. This has an individual arm 38 which protrudes into the throughflow-opening 5 as path-limiting element 34'. This has a width and thickness which endows it with the required stability as path-limiting element and is configured preferably in the carrier layer 10 for this purpose. In particular, it is connected to this circumferential edge via a circular portion of approx. 30° along the circumferential edge of the throughflow-opening 5 in the second functional layer 31.

Figure 13:
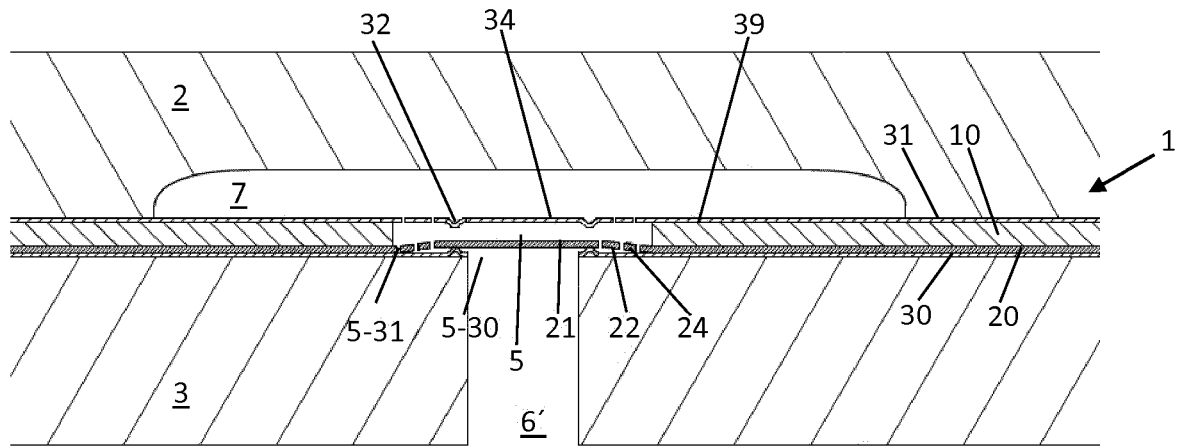
FIGS. 13 and 14 respectively a further embodiment of a transmission control device according to the invention.

FIG. 13 shows a further embodiment of a transmission control device according to the invention which corresponds extensively to that of FIG. 1, in particular FIG. 1b. Differently from in FIG. 1, the lower box 3 in the region of the valve has however no channel extending parallel to the plane of the transmission control plate but rather a boring 6' which extends perpendicularly to the plane of the transmission control plate 4. The transmission control plate 4 is hence supported, in the illustrated region about the throughflow-opening 5, circumferentially on the lower box 3, however it experiences no support by the upper box 2 in the region of the channel 7 so that only the construction-caused intrinsic stability of the transmission control plate in the region of the valve ensures the reproducible valve function.

Furthermore, the embodiment of FIG. 13 differs from FIG. 1 in that the path-limiting element 34 has circumferential bead-shaped embossings 32 which serve as further support for the spring plate 21.

Figure 14:
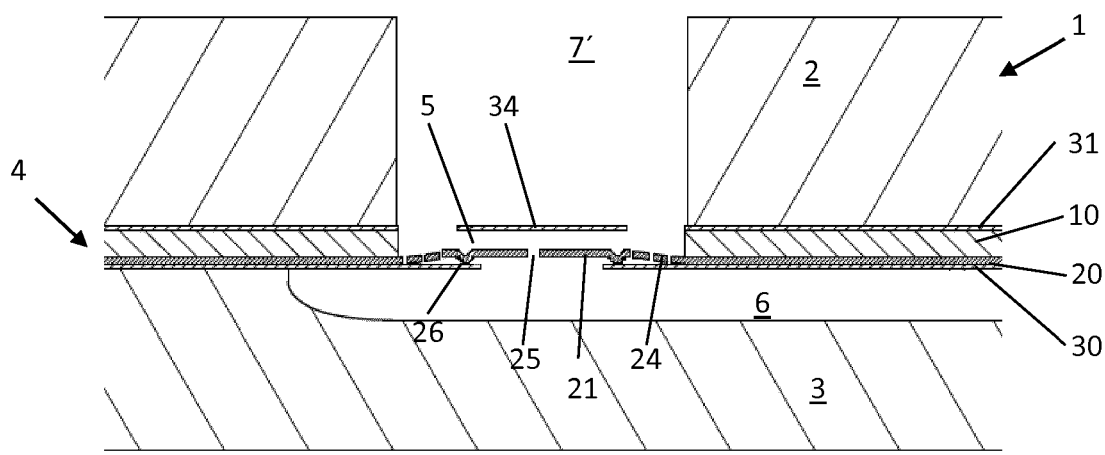

FIG. 14 illustrates an embodiment, similar to FIGS. 1 to 3, of a transmission control device 1 according to the invention, in the case of which a boring 7', which extends essentially perpendicularly to the plane of the transmission control plate 4, is provided now in the upper box 2 instead of a channel 7. The channel 6 in the lower box 3 is open towards the right. Again, there remains, in the region about the valve, a circumferential region which is not supported by both control boxes 2, 3 and only obtains its seal and durably reproducible valve- or diaphragm function as a result of the intrinsic stability of the transmission control plate 4. As in FIG. 8, this embodiment has in fact a diaphragm opening 25 in the spring plate 21 which enables a limited fluid flow counter to the main flow direction of the valve through the through-opening 5.

Furthermore, FIG. 14 differs from the preceding embodiments in that the pretension- and sealing element 26 for the spring plate 21 is now configured not in the first functional layer 30 but in the spring plate 21, i.e. in the spring layer 20. This can be preferable, in particular for production reasons or spatial reasons in some application cases, relative to a support 35 in the first functional layer 30. In turn, the support 26 serves for sealing and pretensioning the spring plate 21.

FIG. 15 shows six embodiments 15a to 15f, by way of example, for support- and/or sealing elements 35a to 35f as support or sealing element for the spring plate 21 respectively in sectional illustration of a section through the respectively circumferential support- and/or sealing element 35, the throughflow-opening 5 abutting respectively on the right against the illustrated portion. As is shown in FIG. 14, analogous elements can also be configured in the spring plate 21 itself, there they are denoted with 26.

Figure 15A:
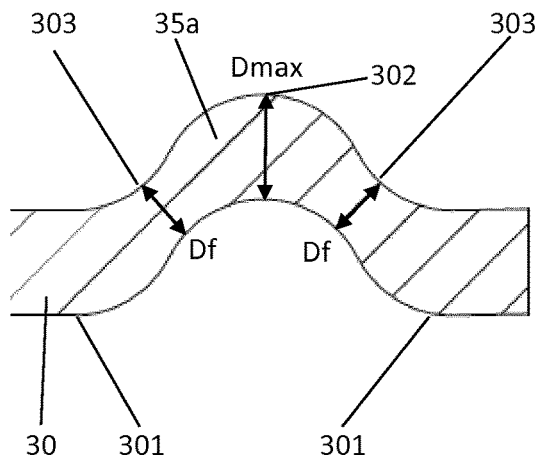
FIG. 15 shows various support- and/or sealing elements of transmission control devices according to the invention.

FIG. 15a shows a bead 35a as is configured already in the preceding embodiments of the transmission control system 1 in the first functional layer 30. The bead has, between two bead feet 301, two rising side regions 303 and a bead roof 302. The material thickness thereby—perpendicularly to the neutral axis of the metal sheet—in the region of the bead sides, is reduced by more than 25% relative to the material thickness in the region of the bead roof, which corresponds essentially to the material thickness in the region of the bead feet: $D_F < 0.75\ D_{max}$. This side tapering causes an increase in rigidity of the bead, which causes a particularly good seal and reliable support of the spring plate precisely also in the region above and/or below channels.

Figure 15D:
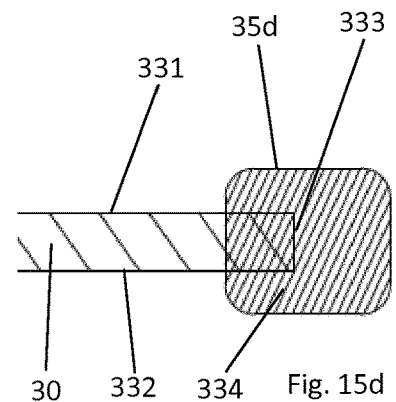
Figure 15B:
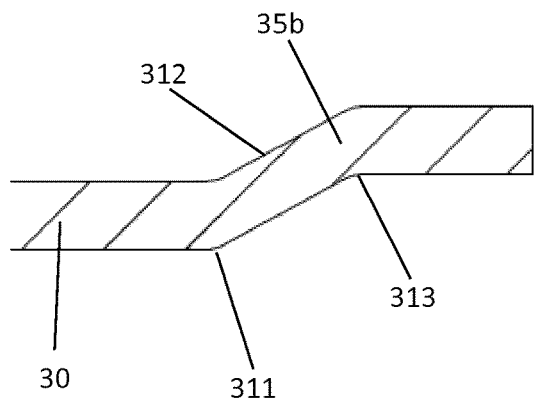

FIG. 15b shows a half-bead 35b as support- and/or sealing element 35. This half-bead has a rising region 312 between two bent points 311, 313.

Figure 15E:
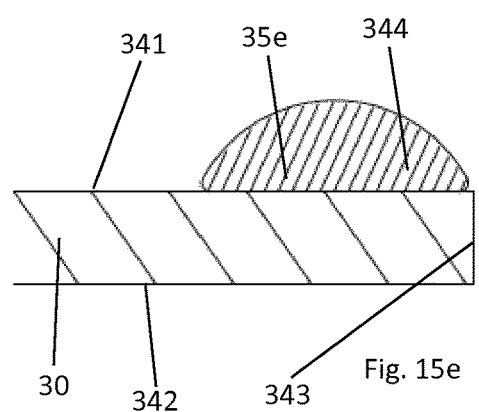
Figure 15C:
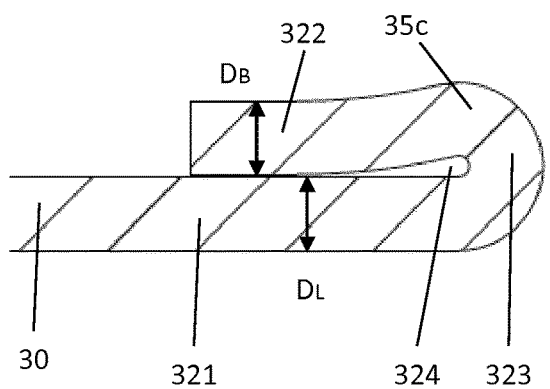

In FIG. 15c, a bordered support- and/or sealing element 35c is shown. The edge region 322, i.e. the free end of the layer 30, is folded back towards the region 321 for this purpose. A new, bent edge 323 is thereby formed. According to the extent of the folding, a free space 324 can remain between the bordered region 322 and the adjacent region 321. The bordered support- and/or sealing element 35c has, as such, already sufficient rigidity to bridge channels. In order to increase this rigidity further, the bordered region 322 can be tapered so that $D_B < D_L$.

Figure 15F:
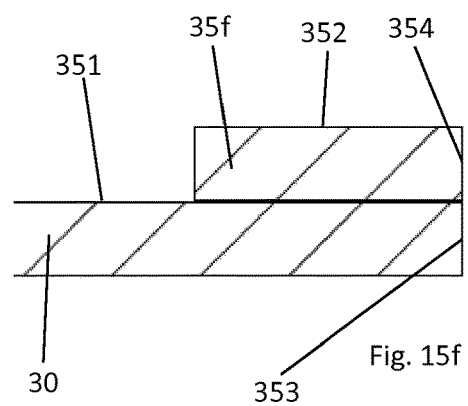

Whilst the embodiments of FIGS. 15a to 15c form the support- and/or sealing element 35 made of the material of the layer 30 itself, FIGS. 15d to 15f represent embodiments in which an additional element forms the support- and/or sealing element 35. This thereby concerns an annularly circumferential elastic element (FIGS. 15d and 15e) or an annularly circumferential metallic element (FIG. 15f).

In the embodiment of FIG. 15d, an elastic element 334 is applied as support- and/or sealing element 35d on the edge 333 pointing towards the through-opening 5, which element extends from the upper side 331 of the layer 30 over the side edge 333 to the lower side 332 and thereby forms a raised portion over upper- and lower side 331, 332. In the embodiment of FIG. 15e, the elastic element 344 extends, in contrast, only on the upper side 341 of the layer 30, orientated towards the spring layer 20 in the installed situation; side edge 343 and lower side 342 remain free.

In FIG. 15f, finally a metallic ring 352 is applied on the surface 351 of the layer 30, the edge 354 of which forms a flush seal with the edge 353. The thickness of ring 352 and layer 30 is essentially identical here, however could also be chosen to be different. Likewise, identical metal sheets or sheets made of different metals can be used. Preferably the ring 352 is attached to the layer 30, in particular attached integrally and preferably welded to the layer 30.

Figure 16:
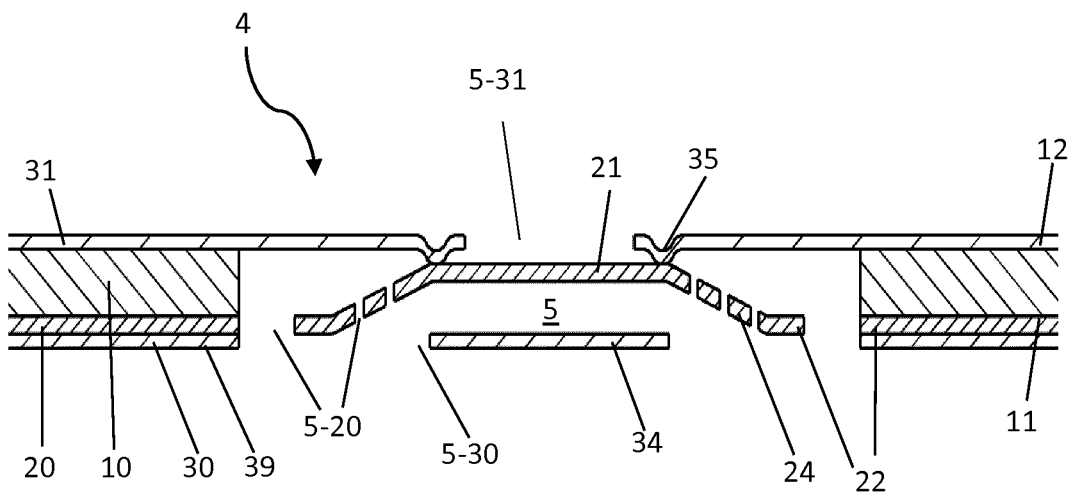
FIG. 16 a further embodiment of a transmission control plate according to the invention with mounting of the spring plate on the second functional layer.

FIG. 16 shows a further embodiment of a transmission control plate 4 for use in a transmission control device 1 according to the invention.

The section illustrated in FIG. 16 in cross-section through the transmission control plate 4 shows in turn a carrier layer 10. This carrier layer 10 has a first side 11 and a second side 12, a spring layer 20 and a first functional layer 30 being disposed adjacent to the first side 11. Adjacent to the second side 12, a second functional layer 31 is disposed.

The transmission control plate 4 is now configured similarly to that in FIG. 1. The functions of the first functional layer 30 and of the second functional layer 31 are however partially exchanged here. Thus the second functional layer 31 has a valve opening 5-31. Along the circumferential edge of this valve opening 5-31, a sealing bead 35 is provided in the second functional layer 31 as support for the spring plate 21. The spring plate 21 of the spring layer 20 is now pretensioned in the region of the retaining arms 24 such that it is supported on the sealing bead 35 as support, in the closed state of the valve, and closes the valve opening 5-31.

If now for example the pressure of a fluid above (in the Figure) the second functional layer 31 is sufficiently high, then the spring plate 21 is pressed out of the seat thereof on the sealing bead 35 so that, between the second functional layer 31 and the spring plate 21, the fluid can flow through the through-opening 5.

In the case of sufficiently high pressure of the fluid, the spring plate 21 continues to be deflected and finally is limited in its deflection by a path-limiting element 34 of the first functional layer.

In the spring layer 20, in addition to the openings 5-20 formed by the retaining arms 24, also further through-openings 5-20 are disposed between the retaining arms 24, visible in the sectional plane, and the part of the spring layer 20, situated outside the opening 5, through which openings the fluid can flow.

Figure 17:
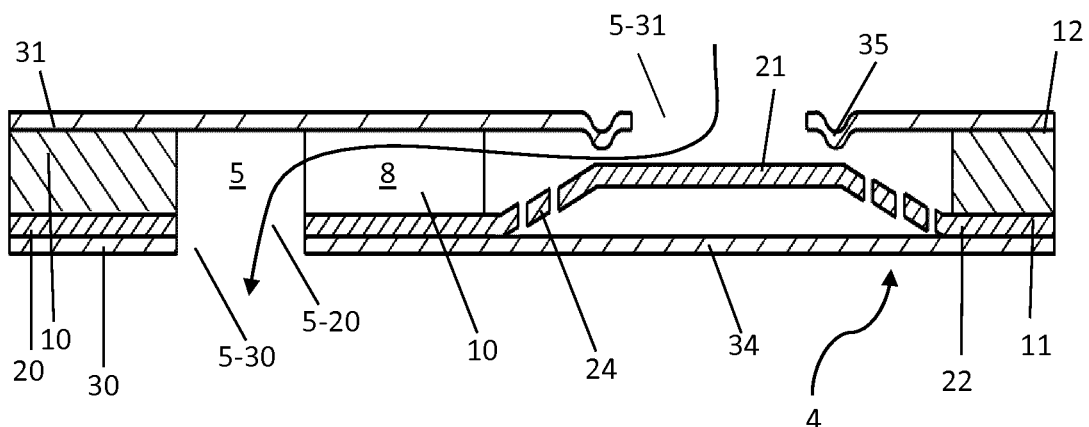
FIG. 17 a further embodiment of a transmission control plate according to the invention with mounting of the spring plate on the second functional layer and offset throughflow-opening.

FIG. 17 shows a further transmission control plate 4 which is configured similarly to that in FIG. 16. However, now the valve opening 5-31 is disposed offset relative to the through-opening 5-30 in the first functional layer 30. The fluid is now guided from the opening 5-31 to the opening 5-30 through a fluid channel 8, situated in the carrier layer 10, in the plane of the carrier layer 10. In FIG. 17, the channel 8 is disposed not completely circumferentially about the spring plate 21. In FIG. 17 therefore, residual parts of the carrier layer 10 which clamp the spring layer 20 between the carrier layer 10 and the first functional layer 30 are illustrated in the background. In FIG. 17, the through-openings between the retaining arms 24 now no longer serve for fluid passage from one surface of the transmission control plate to the other, since the first functional layer 30 in the region of the spring plate 21 has a complete, unbroken path limiter for the spring plate 21.

Figure 18:
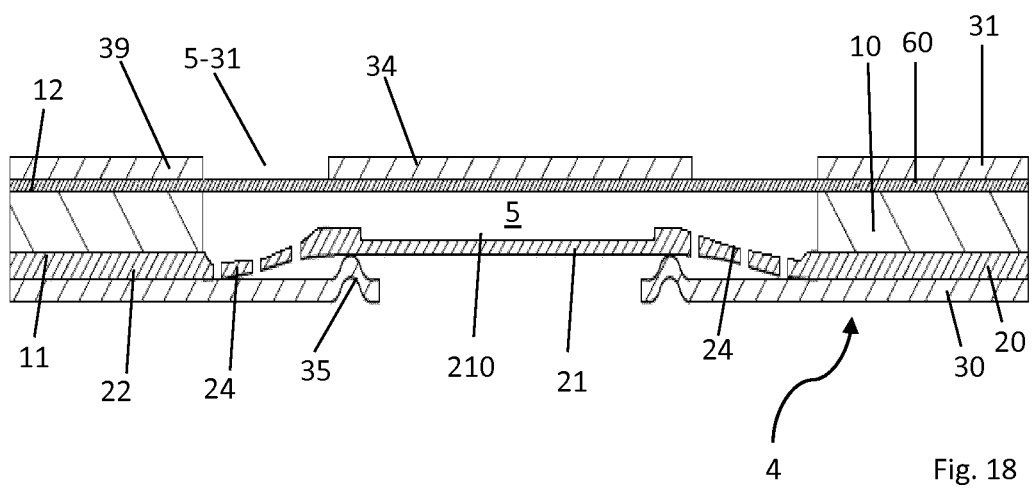
FIG. 18 a further embodiment of a transmission control plate according to the invention with additional filter layer.

FIG. 18 shows a further embodiment of a transmission control plate 4. This transmission control plate 4 in the region of the through-opening 5 is configured similarly to that in FIG. 1. In contrast to FIG. 1, a sieve layer 60 is now disposed between the carrier layer 10 and the second functional layer 31. If the through-opening 5 is flowed though for example by hydraulic oil, then this hydraulic oil also flows through the sieve layer 60 and is hereby freed of coarse particles.

Furthermore, the spring layer 20 in the region of the retaining arms 24 is configured with a lesser thickness than the retaining region 22 surrounding the retaining arms 24 towards the outside. By varying the size or thickness of the connection elements 24, the elastic behaviour of the spring plate 21 can be influenced. Thinner connection elements 24, as illustrated in the example of FIG. 18, are more easily deformable, whilst thicker connection elements 24 set a greater resistance counter to a deflection of the spring plate 21 out of its inoperative position.

The spring plate 21 is thinned, for its part, in the central region 210. As a result, the inert mass of the spring plate 21 is reduced and consequently the deflection behaviour thereof is influenced.

By the design of the connection elements 24, of the spring plate 21, by the setting of a pretension of the spring plate 21, by the mounting of the spring plate 21 in the closed state of the valve on the first or on a second functional layer, by the design of the support points of the spring plate on the respective functional layer and/or by the design of one or more path-limiting elements on the side of the carrier layer 10 situated respectively opposite the valve opening, it is possible to vary the closing behaviour and/or the opening behaviour of the spring plate 21 and to adjust them according to the respective requirements.

Figure 19:
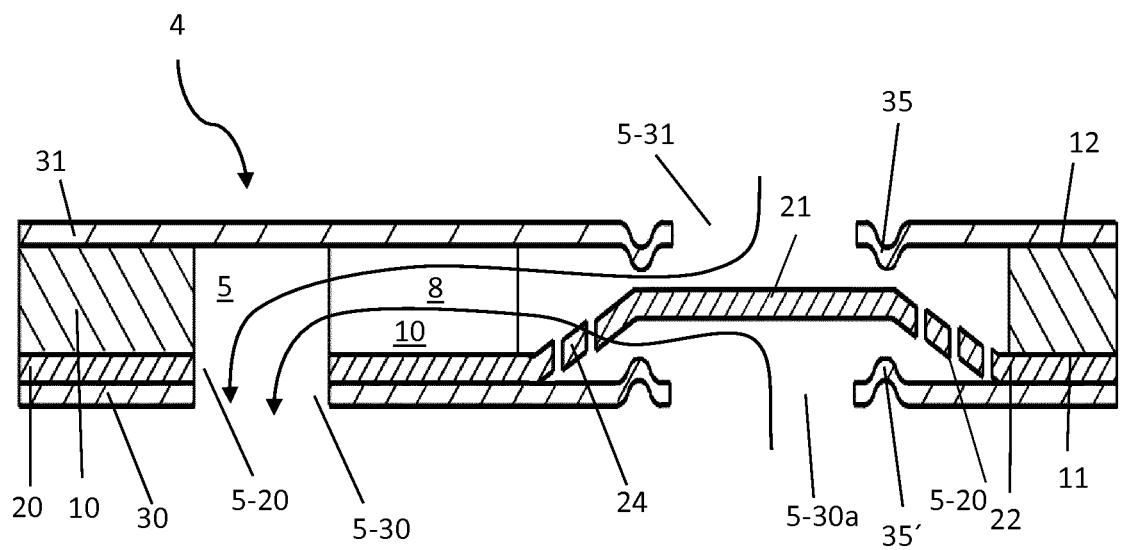
FIG. 19 a further embodiment of a transmission control plate according to the invention.

FIG. 19 shows a further embodiment of a transmission control plate according to the invention. This is similar to that in FIG. 17. In contrast to the embodiment of FIG. 17, the first functional layer 30 now has a further opening 5-30a which is disposed, in projection of the transmission control plate on the layer plane(s) thereof, within the spring plate 21. Hence, it is situated opposite the opening 5-31 and can likewise be closed by the spring plate 21. Circumferentially about the opening 5-30a, similarly to the layer 31, a bead-shaped support 35' for the spring plate 21 is also provided in the layer 30. This support 35' also serves both for reliable closing of the opening 5-30a by the spring plate 21 and the pretension thereof in the supported state.

Between the opening 5-30a and the channel 8, a through-flow of media through the openings 5-20 between the retaining arms 24 is possible. According to the position of the spring plate 21, a fluid flow through the opening 5-31, the channel 8 and the opening 5-30, or a fluid flow through the opening 5-30a, the channel 8 and the opening 5-30 is hence possible. Also simultaneous flow along both of the above-described flow paths is possible if the spring plate 21 is supported neither on the layer 30 nor on the layer 31.

The arrangement of FIG. 19 now forms an "OR" valve, in the case of which, according to the pressure conditions on the first side 11 and on the second side 12 of the carrier layer 10, a flow through the channel, starting from one or both of the openings 5-30a and 5-31 acting as inlets, is effected, as the arrows indicate.

Figure 20:
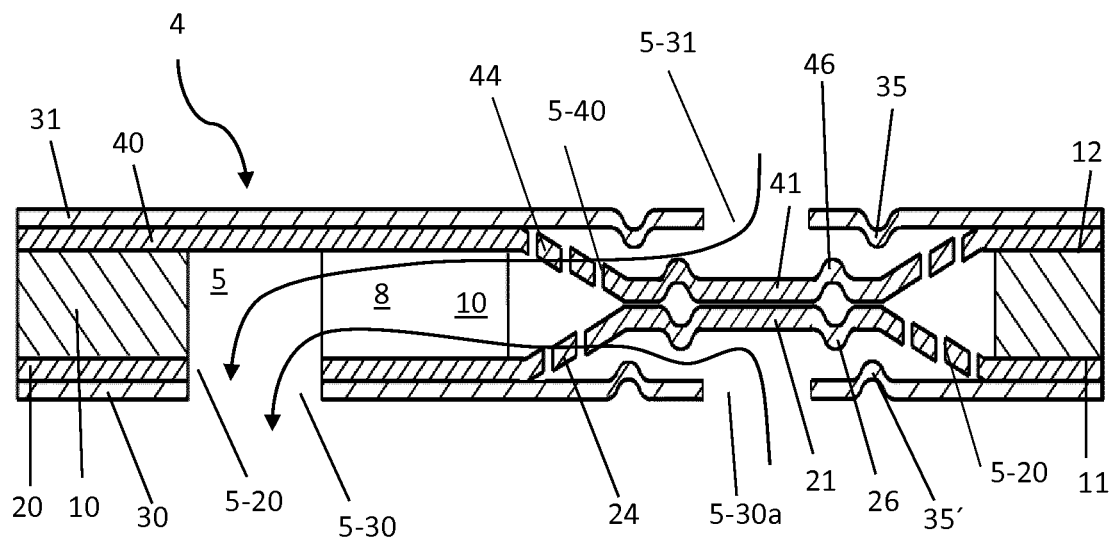
FIG. 20 a further embodiment of a transmission control plate according to the invention.

FIG. 20 shows a transmission control plate which is constructed similarly to that in FIG. 19. In addition, a further spring layer 40 is disposed between the carrier layer 10 and the second functional layer 31. This has, symmetrically (mirrored on the central plane of the carrier layer 10) relative to the spring layer 20, a spring plate 41. The spring plates 21 and 41 have respectively circumferential support elements 26 and 46 which are configured as a bead-shaped raised portion towards the outside relative to the adjacent functional layer 30 or 31. These support elements 26 and 46 serve for reliable and sealed support of the spring plates 21 and 41 on the circumferential edge of the valve openings 5-30a and 5-31. By suitable choice of the surfaces enclosed by the support elements 26 and 46, with the same but time-offset pressure on the through-openings 5-30a and 5-31, the switching position for the first applied signal (pressure) can be fixed since, upon support of one of the spring plates 21 and 41 with the same pressure on both sides of the spring plate, because of the surface ratios of the spring plates 21 and 41 (the supporting side has a smaller cross-section which is supplied with the pressure), the first adopted position is maintained.

At the same time, the function of FIG. 19 is likewise achieved here, i.e. a pressure-switched "OR" valve. Particular advantages of this embodiment result from the fact that the illustrated arrangement is symmetrical relative to the central plane of the carrier layer and hence, for pressure from the opening 5-31, shows the same behaviour as for pressure from the opening 5-30a.

The invention claimed is:

1. A transmission control device, having two counter-components which are disposed opposite each other, and also a planar transmission control plate which is disposed between surfaces of the two counter-components which are situated opposite each other, comprising:
fluid channels which extend between adjacently disposed surfaces respectively of one counter-component and of the transmission control plate parallel to the plane of the respective surfaces, and/or borings which extend perpendicularly or essentially perpendicularly to the plane of the respective surface being configured, the transmission control plate having at least one throughflow-opening for a fluid, which opening penetrates the transmission control plate and connects together said fluid channels which extend on different sides of the transmission control plate or said borings which extend on different sides of the transmission control plate or just one of said fluid channels which extends on one side of the transmission control plate with just one of said borings which extends on the oppositely situated side of the transmission control plate,
the transmission control plate having at least one planar carrier layer with a first surface which is orientated towards the first counter-component, and with a second surface which is situated opposite the first surface and orientated towards the second counter-component, a first functional layer which is disposed adjacent to the first surface and a spring layer which is disposed between the first functional layer and the carrier layer,
the spring layer having at least one spring plate which is disposed, in projection of the transmission control plate perpendicularly to the planar extension thereof, within at least one throughflow-opening in the spring layer;
wherein said first functional layer has at least one path-limiting element for limiting the path of the spring plate.

2. The transmission control device according to claim 1, wherein the spring plate, in the closed state of the throughflow-opening, is supported in a region of the first functional layer which is adjacent to the circumferential edge of the throughflow-opening.

3. The transmission control device according to claim 1, whereby a second functional layer which is disposed adjacent to the second surface of the carrier layer.

4. The transmission control device according to claim 3, wherein the first and/or the second functional layer has flow-conducting elements which are disposed, in projection of the transmission control plate perpendicularly to the planar extension thereof, within the throughflow-opening in the functional layer, and which are configured such that they set a fluid, which is flowing along the flow axis of the throughflow-opening, in a rotational movement about this longitudinal axis.

5. The transmission control device according to claim 3, wherein said path-limiting element, which is in one piece with at least one of the functional layers, for limiting the path of the spring plate and is connected to the circumferential edge of the throughflow-opening of at least one of the functional layers at at least two connection points, and is disposed between the connection points, in projection of the transmission control plate perpendicularly to the planar extension thereof, within the throughflow-opening of at least one of the functional layers, and at a spacing relative to the circumferential edge of the throughflow-opening of the carrier layer and/or of the functional layer.

6. The transmission control device according to claim 5, wherein at least one pair of adjacent connection points are disposed along the circumferential edge, relative to the center of the connection points, offset by at least 85° relative to each other.

7. The transmission control device according to claim 5, wherein the path-limiting element is mounted elastically on a region about the throughflow-opening, which region is adjacent to the circumferential edge about the throughflow-opening of at least one of the functional layers and forms a resilient limit stop.

8. The transmission control device according to claim 7, wherein the spring plate and the path-limiting element have different spring rates, including the path-limiting element having a higher spring rate than the spring plate.

9. The transmission control device according to claim 5, wherein the path-limiting element, in the direction of at least one of the functional layers, on which the spring plate is supported in the closed state, has at least one embossing, which protrudes and is disposed opposite the spring plate, and/or the spring plate, in the direction of at least one of the functional layers, on which the spring plate is supported in the closed state, has at least one embossing which protrudes and is disposed opposite the path-limiting element, including a cup-shaped embossing.

10. The transmission control device according to claim 5, wherein the path-limiting element has embossings which protrude in the direction of the spring plate and are disposed away from the spring plate, and/or the spring plate has embossings which protrude in the direction of the path-limiting element and are disposed opposite the path-limiting element, including a bead or profiling which extends circumferentially at least in portions, or a metal ring or a rubber element.

11. The transmission control device according to claim 3, wherein a region which is adjacent to the circumferential edge of the throughflow-opening of at least one of the functional layers on which the spring plate is supported in the closed state has, as support for the spring plate, or the spring plate has, in the outer edge region thereof as support in the closed state of the throughflow-opening and extending circumferentially at least in regions, a border, a metal ring, a rubber element, a half-bead, a full bead or an undulating profile.

12. The transmission control device according to claim 11, wherein the thickness ($D_F$), which is determined perpendicularly to a course of the neutral axis of at least one of the functional layers, on which the spring plate is supported in the closed state, of one, several or all of the sides of the half-bead, of the full bead or of the undulating profiling, relative to the thickness ($D_{max}$) of at least one of the functional layers, is reduced laterally adjacent to the bead or the profiling, including a reduction of ≥22%, or the thickness ($D_B$), which is determined perpendicularly to the course of the neutral axis of at least one of the functional layers, of a bordered region of a border is reduced relative to the thickness ($D_L$) of the region of at least one of the functional layers which is adjacent to the relevant border, including a reduction of ≥8%.

13. The transmission control device according to claim 1, whereby the spring plate, in the closed state of the throughflow-opening, is supported in a region of the second functional layer which is adjacent to the circumferential edge of the throughflow-opening.

14. The transmission control device according to claim 1, wherein said path-limiting element has at least two webs which protrude, in projection of the transmission control plate perpendicularly to the planar extension thereof, into the throughflow-opening, at least two of the webs being connected together at ends thereof which are opposite the circumferential edge of the throughflow-opening, and which span across the throughflow-opening.

15. The transmission control device according to claim 1, wherein the path-limiting element has at least one web which protrudes into the throughflow-opening, the at least one web being connected in one piece to the circumferential edge of the throughflow-opening of the carrier layer at least 30° of the circular circumference of the circumferential edge.

16. The transmission control device according to claim 1, wherein the spring plate is connected in one piece to the spring layer via one retaining arm, two retaining arms, three retaining arms, four retaining arms or more than four retaining arms, including said least one retaining arm being branched to create additional retaining arms.

17. The transmission control device according to claim 16, wherein at least one of the retaining arms is configured as a helical retaining arm which extends between the circumferential edge of the throughflow-opening in the spring layer and the outer circumferential edge of the spring plate also along one of the circumferential edges.

18. The transmission control device according to claim 16, wherein at least one of the retaining arms has a predetermined spring characteristic perpendicularly to the plane of the throughflow-opening, including a linear or non-linear spring characteristic line.

19. The transmission control device according to claim 1, wherein all the layers of the transmission control plate have essentially the same extension and/or outer contour.

20. The transmission control device according to claim 1, wherein the transmission control plate has a second functional layer which is disposed adjacent to the second surface, and a further spring layer which is disposed between the second functional layer and the carrier layer, the further spring layer having at least one further spring plate which is disposed, in projection of the transmission control plate perpendicularly to the planar extension thereof, within a second throughflow-opening in the further spring layer, and, in the closed state of the second throughflow-opening, is supported on the region of the second functional layer which is adjacent to the circumferential edge of the throughflow-opening.

* * * * *